United States Patent [19]

Sasaki et al.

[11] Patent Number: 4,912,164

[45] Date of Patent: Mar. 27, 1990

[54] INK COMPOSITIONS FOR WATERLESS PLATES

[75] Inventors: Makoto Sasaki, Yokohama; Shozo Tsuchiya, Tokyo; Norimasa Ikeda; Mitusuru Suezawa, both of Otsu, all of Japan

[73] Assignees: Nippon Oil Co., Ltd.; Toray Industries Inc., both of Tokyo, Japan

[21] Appl. No.: 254,883

[22] Filed: Oct. 7, 1988

[30] Foreign Application Priority Data

Oct. 9, 1987 [JP] Japan .................................. 62-253730

[51] Int. Cl.$^4$ ............................................. C08L 61/04
[52] U.S. Cl. ................................... 525/68; 101/450.1; 106/20; 525/139; 526/272
[58] Field of Search ................... 525/68, 139; 106/20; 526/272

[56] References Cited

U.S. PATENT DOCUMENTS 4,552,923 11/1985 Tsuchiya et al. ..................... 525/68

Primary Examiner—Theodore E. Pertilla
Attorney, Agent, or Firm—Bucknam and Archer

[57] ABSTRACT

An ink composition for waterless plates for lithography, which comprises as the vehicle a resin (III) obtained by copolymerizing a five-membered compound, such as cyclopentadiene, and/or a Diels-Alder adduct thereof with an unsaturated aromatic hydrocarbon monomer to obtain a resin (I), reacting the resin (I) with an unsaturated carboxylic acid and/or the anhydride thereof to obtain a resin (II) and then further reacting the resin (II) with a phenolic resin to obtain the resin (III).

3 Claims, No Drawings

INK COMPOSITIONS FOR WATERLESS PLATES

BACKGROUND OF THE INVENTION

1. Field of the Invention

This invention relates an ink composition which will exhibit excellent printability and satisfactory resistance to scumming when used in a waterless plate for lithography.

2. Prior Art

In lithography which is mainly used in the printing field, there is employed a plate consisting of hydrophilic nonimage area and oleophilic printing area. In the plate, a dampening solution is attached to the hydrophilic non-image area while an oleophilic ink is attached to the oleophilic printing area by making use of the tendency that water and an oleophilic ink are repulsive to each other and then the oleophilic ink so attached to the printing area is transferred to a to-be-printed substrate thereby obtaining a desired print.

In such conventional lithography, however, it is difficult to control the dampening solution which serves to prevent the ink from adhering to the non-image area and it constitutes a serious technical obstacle to use such a dampening solution from the viewpoint of printability and printing effects. In attempts to overcome these disadvantages, there have heretofore been proposed various lithographical methods using waterless lithographical plates. As the newest and practicable lithographical method using a waterless plate, there has been proposed a printing method using a plate in which the non-image area are covered with non-tacky thin films of silicone rubber or the like. In this printing method so proposed, it is reported that printing can be effected with a usual oleophilic ink without the supply of a dampening solution It has now been found undesirable, however, that scumming will disadvantageously be caused when a conventional oleophilic ink is used for printing since the printability of the conventional ink is unsuitable.

The reason why scumming is caused in waterless lithography is that the ink used lowers in cohesion due to a rise of the plate in temperature derived from the friction of the moving parts and rolls of the printing press used during printing whereby the ink adheres to the non-image area which are originally repulsive to such inks.

To avoid this drawback, there have been proposed a method using a printing ink incorporated with a silicone compound (Japanese Pat. Gazette No. 50-11287, Japanese Pat. Appln. Laid Open Gazette No. 55-31885), a method using a printing ink which contains a resin modified with a silicone compound (Japanese Pat. Gazettes Nos. 51-10124, 52-10041 and 52-10042), and the like. These methods, however, have still not satisfactorily solved problems as to scumming and have left unsolved problems as to unsatisfactory levelling of inks, unsatisfactory gloss, and the like. There has also proposed an improved method in which is used a varnish having gelled by incorporation with, for example, and aluminum compound such as aluminum stearate or aluminum octoate. When high anti-scumming property is attempted to be attained with the above improved method, the ink used will greatly increase in viscosity whereby are raised problems as to ink transferability such as transfer of the ink on the printing press or to the plate or blanket, this proving that said improved method is still not satisfactory at the present.

SUMMARY OF THE INVENTION

The primary object of this invention is to provide a ink for waterless plate composition which eliminates the above drawbacks of the conventional inks and is excellent in scumming resistance, gloss and printability.

The present inventors made intensive studies in attemptes to solve the above-mentioned problems and, as the results of their studies, found that the problems can be solved by using, as the vehicle for an ink for waterless plates, a specific resin prepared by copolymerizing (A) a compound containing a cyclopentadiene ring or a Diels-Alder adduct of said compound with (B) an unsaturated aromatic hydrocarbon monomer having a carbon-carbon double bond and a benzene ring in the molecule to obtain a hydrocarbon resin and thereafter modifying the thus obtained resin with an acid and then with a resol-type phenol resin to obtain the specific resin.

More specifically, the specific resin contained as the vehicle in the ink composition of this invention for use in waterless plates may be obtained by copolymerizing 100 parts by weight of (A) a five-membered cyclic compound having a conjugated double bond represented by the following general formula;

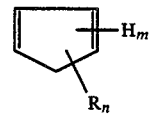

wherein H is hydrogen, R is an alkyl group having 1-3 carbon atoms, m and n are each zero or an integer of at least one, and m+n=6, and/or a Diels-Alder adduct, with 5-200 parts by weight of (B) an unsaturated aromatic hydrocarbon monomer having an carboncarbon double bond and a benzene ring in molecule to obtain a hydrocarbon resin (I), reacting 100 parts by weight of the thus obtained hydrocarbon resin (I) with (C) 0.5-20 parts by weight of an unsaturated carboxylic acid and/or the anhydride thereof to obtain an acid-modified resin (II) and then thermally reacting 100 parts by weight of the thus obtained acid-modified resin(II) with 5-100 parts by weight of (D) a phenol resin prepared by condensing a phenol compound with formaldehyde (in the form of formalin), thereby to obtain the specific or final modified resin (III).

The comound (A) used in this invention is either a fivemembered cyclic compund having a conjugated double bond represented by the following general formula;

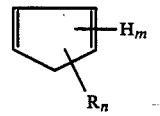

wherein H is hydrogen, R is an alkyl group having 1-3 carbon atoms, m and n are each zero or an integer of at least one, and m+n=6, or a Diels-Alder adduct of said five-membered cyclic compound having a conjugated double bond. The five-membered cyclic compounds according to this invention include cyclopentadiene and methylcyclopentadiene, and the Diels-Alder adducts according to this invention include dicyclopentadiene, cyclopentadiene-methylcylopentadiene comonomer and tricyclopentadiene. These five-membered cyclic compounds and Diels-Alder adducts thereof may be used singly or jointly as the compound (A) with cyclopentadiene, dicyclopentadiene and mixtures thereof being particularly preferred.

Cyclopentadiene, dicyclopentadiene or an alkyl-substituted derivative thereof, which may be used in this invention, is not necessarily required to be highly pure but is desired to be at least 80 wt. % pure.

The compound (A) used in this invention may also be a concentrated fraction obtained by thermally dimerizing cyclopentadiene and methylcyclopentadiene contained in a $C_5$ fraction which is a by-product oil obtained by the high-temperature pyrolysis of naphtha and/or the like, to obtain a mixture of dicyclopentadiene, dimethylcyclopentadiene, cyclopentadiene-methylcyclopentadiene comonomer, cyclopentadieneisoprene comonomer, cyclopentadiene-piperylene comonomer and the like and then removing the greater part of the $C_5$ ingredients such as $C_5$ olefins and $C_5$ paraffins from the dimer mixture-containing $C_5$ fraction thereby to obtain the concentrated fraction.

The compound (B) used in this invention is an unsaturated aromatic hydrocarbon monomer having a carbon-carbon double bond and a benzene ring and is illustrated by styrene, vinyltoluene, α-methylstyrene, indene and methylindene. Among these compounds, the former three are particularly preferred since they, together with the compound (A), are very effective in producing a high-molecular-weight resin wherely the resulting ink composition will have very satisfactory resistance to scumming.

The compound (B) may also be an aromatic fraction containing unsaturated aromatic ingredients, the fraction being obtained by the decomposition of naphtha. In this case, it is particularly preferred that the aromatic fraction be further refined to obtain a vinyltoluene-rich fraction for use as the compound (B).

According to this invention, 100 parts by weight of the above compound (A) are reacted with 5-200, preferably 10-180, parts by weight of the above compound (B) in the absence or presence of a suitable catalyst to produce a hydrocarbon resin (I). In a case where the reaction is effected in the absence of a catalyst, the above mixture of the compounds (A) and (B) may be heated to 200°-300° C. for 30 minutes to 15 hours, preferably 1-12 hours, to produce the hydrocarbon resin (I). On the other hand, in a case where the reaction is effected in the presence of a catalyst, the catalyst may be a Friedel-Crafts type catalyst such as boron trifluoride, a complex thereof with phenol, an ether, acetic acid or the like, or aluminum chloride. These catalysts may be used in amounts by weight of 0.1-10%, preferably 0.3-2%, and, in this case, the reaction may be carried out at a reaction temperature of from −30° to 100° C., preferably 0° to 50° C., for a reaction time of 10 minutes to 20 hours, preferably 1 to 15 hours.

In the production of the hydrocarbon resin (I) according to this invention, the use of the compound (B) in amounts of less than said range of amount will result in the production of a final modified resin having an insufficiently high molecular weight and insufficient resistance to scumming, while the use thereof in amounts of more than said range of amount will result in producing a final modified resin having insufficient solubility in solvents having a high boiling point whereby the resulting ink composition decreases in gloss.

The hydrocarbon resin (I) obtained as mentioned above is then reacted with an unsaturated carboxylic acid or the anhydride thereof (C). The compound (C) may preferably be an unsaturated monocarboxylic or polycarboxylic acid having 3-32, preferably 3-15, carbon atoms and is typified by acrylic acid, methacrylic acid, maleic acid, maleic anhydride, tetrahydrophthalic acid or the anhydride thereof, fumaric acid, citraconic acid, itaconic acid or a mixture thereof as well as by the fatty acid of a drying oil such as linseed oil. Among these compounds, maleic acid and maleic anhydride are preferred.

The compound (C) may be used in amounts by weight of 0.5-20, preferably 1-10, parts per 100 parts by weight of the hydrocarbon resin (I). The use of the compound (C) in amounts less than said range of amount will result in the production of an acid-modified resin having less polar groups. Thus, the resin so produced is poor in pigment dispersibility and in characteristics as a resin having polar groups and will produce an ink having undesirably unsatisfactory fluidity and printability when contained as the vehicle in the ink.

On the other hand, the use of the compound (C) in amounts more than said range of amount, will result in producing a resin having too many polar groups whereupon the resin is unsatisfactorily soluble in saolvents and undesirably tends to discolor and gel. When the resin so produced is used in the preparation of an ink, it is unsatisfactorily soluble in a hydrocarbon solvent for making a varnish and the resulting ink will undesirably have poor fluidity and produce a print having poor gloss. The acid-modifying reaction according to this invention may be carried out at 100-300° C., preferably 150-250° C., for 30 minutes to 15 hours, preferably 1-8 hours, in the absence of a catalyst or in the presence of a known redical initiator such as an organic peroxide. It is prefereble that no catalyst be employed when an unsaturated polycarboxylic acid or its anhydride is used as the acid-modifier and that a suitable catalyst be employed when an unsaturated monocarboxylic acid or its anhydride is used in the reaction.

The acid-modified resin (II) may alternatively be produced by the following one-step method.

A mixture of the compounds (A) and (B) is copolymerized under heat at 200°-300° C. while adding an unsaturated carboxylic acid or its anhydride to the copolymerizing reaction system, the addition being started at the initial stage of the reaction or halfway on the reaction, to obtain an acid-modified resin according to this invention.

It is also possible to esterify the acid-modified resin (II) with an alcohol in order to adjust the solubility and softening point of the acid-modified resin (II) or adjust the molecular weight of the final modified resin (III). In this case, a monohydric or polyhydric alcohol may be used for the esterification. The use of a monohydric alcohol having at least 6, preferably 8-18, carbon atoms will result in producing a final modified resin (III) having particularly good solubility. The amount of such an alcohol used is either 0-1.0 mol equivalent per mol equivalent of the carboxyl group in the acid-modified resin (II) or 0-2.0 mol equivalent per mol equivalent of acid anhydride group in the acid-modified resin (II). The esterifying reaction is carried out by heat melting the acid-modified resin or dissolving it in a hydrocarbon solvent such as benzene, toluene or xylene, adding an alcohol to the molten or dissolved resin and then reacting them, for example, at 150°-250° C. for 30 minutes-10 hours, preferably 1-5 hours.

According to this invention, the acid-modified resin (II) is further reacted with a phenol resin (D) to obtain a final modified resin (III). A phenol resin which may be used in this invention is preferably obtained by the condensation of phenol having an alkyl substituent of 4-9 carbon atoms and formaldehyde. The phenol resin industrially preferred includes p-tert.-butylphenol, sec.-butylphenol, p-tert.-octylphenol or nonylphenol.

In substitution for the reaction with a phenol, formaldehyde and a phenolic compound may be reacted with each other in the presence of the acid-modified resin (II) using oxalic acid or maleic acid as the catalyst or using no catalyst, to obtain a desired phenol resin-modified resin.

The amount of a phenol resin used for the modification may preferably be 5-100, more preferably 7-50, parts by weight per 100 parts by weight of the above acid-modified resin (II). In a case where a final modified resin prepared using the phenol resin in amounts less than said range of amount is used as the vehicle for an ink composition, the resulting ink composition will have unsatisfactory fluidity and will not give satisfactorily glossy prints when used for printing. On the other hand, a final modified resin prepared using the phenol resin in amounts more than said range of amount is not only unsatisfactory in solubility in solvents for inks but also industrially uneconomical, this being undesirable.

The reaction may be completed only by mixing the acidmodified resin (II) with the phenol resin, melting them and then heating the molten material at 150°-250° C. for 30 minutes -10 hours, preferably 1-5 hours. As required, there may be used an acid catalyst, such as oxalic acid, toluenesulfonic acid or a Friedel-Crafts' type catalyst, in the reaction.

It is preferable that the final modified resin (III) have a softening point of at least 120° C., preferably at least 140° C. If a final modified resin having a softening point of lower than 120° C. is used in the preparation of a printing ink, the resulting printing ink will exhibit much misting, low drying speed and decreased resistance to scumming when used for printing.

The final modified resin (III) so obtained may be contained in an ink in an amount by weight of preferably 5-50%, more preferably 7-50% and further more preferably 10-45% of the ink. In a case where the final modified resin (III) is used in amounts outside of said range of amount in the preparation of an ink, the resulting ink will be likely to be unbalanced as such. For example, the use of the resin (III) in amounts by weight of less than 5% will result in producing an ink which tends to cause scumming when used for printing because of its low cohesion. On the other hand, the use thereof in amounts by weight of more than 50% will result in producing an ink which, when used, will not only tend to be unsatisfactorily transferred from roll to roll and unsatisfactorily attached to the blanket because of its too high cohesion, but also tend to worsen its levelling on a to-be-printed substrate whereby the gloss is degraded.

The final modified resin (III) may be further modified with a compound containing a silicone component, or the vehicle in a varnish may be wholly modified by adding a silicone ingredient-containing compound to the varnish when cooking the varnish. The silicone ingredient-containing compound used herein is usually typified by an organopolysiloxane which includes an organopolysiloxane having one or more hydroxyl groups or alkoxy group in the molecule or having one or more Si-H bonds in the molecule. It is preferable that these compounds have molecular weight of 3,000,000-150,000.

The other known ingredients which may be used in conventional lithography, may also be used in the preparation of ink compositions of this invention. They include drying and semi-drying oils such as linseed oil, tung oil, soybean oil, safflower oil and castor oil; solvents such as petroleum-derived solvents boiling within 200°-350° C.; and gelling agents such as organoaluminum compounds, organotitanate compound, organozinc compound and organocalcium compound.

Coloring agents which may be used in the preparation of ink compositions of this invention are such inorganic and organic ones that have heretofore been used in conventional ink compositions.

Known ingredients such as waxes, greases, desiccants, dispersants and fillers, may be used in this invention as required.

In addition to these, other resins such as resin-modified phenol resins, alkyd resins and petroleum resins, may also be used in such amounts that they do not impair the performances of the resulting ink compositions.

Inks prepared by kneading such ingredients as mentioned above with a three-roll unit do not cause scumming except at high temperatures and are excellent in printability. Further, pinted matters on which the above inks are printed have satisfactory gloss without piling caused.

DESCRIPTION OF THE PREFERRED EMBODIMENTS

This invention will be better understood by the following exemplary Syntheses and Examples to which this invention is not limited.

Synthesis 1

Three hundred and fifty (350) grams of 97% pure dicyclopentadiene, 350 g of styrene and 300 g of mixed xylenes were charged into a 2-liter autoclave and the whole was heated to 270° C. under agitation for 6 hours in a nitrogen atmosphere. After the end of the heating, the autoclave was cooled and the contents therein were distilled to remove the unreacted monomers, low polymers and xylenes therefrom thereby to obtain 663 g of a resin (1-I) as the bottoms. The resin (1-I) had a softening point of 144.0° C.

Two hundred and forty (240) grams of the thus obtained resin (1-I) were heated to 220° C. for melting, and incorporated with 7.2 g of maleic anhydride, after which the whole was reacted under agitation for 4 hours thereby to obtain an acid-modified resin (1-II) having a softening point of 151.5° C. and an acid value of 12.2 mg KOH/g.

One hundred and eighty (180) grams of the thus obtained acid-modified resin (1-II) were incorporated with 20 g of a resoltype phenol resin obtained from p-tert.-octylphenol and formaldehyde and then reacted together at 220° C. for 3 hours thereby to obtain a final modified resin (1-III) having a softening point of 169.5° C. and an acid value of 11.9 mg KOH/g.

Synthesis 2

Three hundred and twenty (320) grams of 97% pure dicyclopentadiene, 480 g of an aromatic fraction boiling at 140°–200° C. (unsaturated aromatic components, 50%; saturated aromatic components, 50%; 70% of the unsaturated aromatic components being vinyltoluene) obtained by the pyrolysis of naphtha, and 200 g of mixed xylenes were charged into a 2-liter autoclave, reacted under agitation at 270° C. for 9.5 hours and then further treated in the same manner as in Synthesis 1 thereby to obtain 549 g of a resin (2-I) having a softening point of 140.5° C.

Two hundred and forty (240) grams of the thus obtained resin (2-I) were melted under heat, incorporated with 9.6 g of maleic anhydride and then reacted together under agitation for 4 hours to obtain an acid-modified resin (2-II) having a softening point of 156.5° C. and an acid value of 15.1 mg KOH/g.

Then, 180 g of the thus obtained acid-modified resin (2-II) were incorporated with 20 g of a resol-type phenol resin obtained from p-tert.-octylphenol and formaldehyde, and then reacted at 220° C. for 3 hours to obtain a final modified resin (2-III) having a softening point of 171.5° C. and an acid value of 14.8 mg KOH/g.

Synthesis 3

A $C_5$ fraction (boiling at 28°–60° C.) obtained as a by-product by the steam cracking of naphtha to produce ethylene, propylene and the like, was heated to 120° C. for 4 hours and freed from the remaining $C_5$ fraction by distillation to obtain a residue comprising 85% of dicyclopentadiene and 15% of "cyclopentadiene/isoprene comonomer or cyclopentadiene/piperylene" comonomer. Then, 427 g of the thus obtained residue containing said 85% of dicyclopentadiene, 273 g of styrene and 300 g of mixed xylenes were charged into a 2-liter autoclave, reacted together at 270° C. under agitation for 6.5 hours and then treated in the same manner as in Synthesis 1 to obtain 693 g of a resin (3-I) having a softening point of 146.0° C.

Then, 240 g of the thus obtained resin (3-I) were heated and melted, incorporated with 7.2 g of maleic anhydride and then reacted under agitation for 4 hours to obtain an acid-modified resin (3-II) having a softening point of 152.0° C. and an acid value of 11.9 mg KOH/g.

Thereafter, 180 g of the thus obtained acid-modified resin (3-II) were incorporated with 45 g of a resol-type phenol resin prepared from p-nonylphenol and formaldehyde and then reacted together at 220° C. for 3 hours to obtain a final modified resin (3-III) having a softening point of 168.5° C. and an acid value of 10.8 mg KOH/g.

Comparative Synthesis

Seven hundred (700) grams of 97% pure dicyclopentadiene and 300 g of mixed xylenes were charged into a 2-liter autoclave, reacted together under agitation at 260° C. for 2.5 hours and then treated in the same manner as in Synthesis 1 to obtain 571 g of a resin (4-I) having a softening point of 140.5° C.

Then, 240 g of the thus obtained resin (4-I) were heated to 220° C. for melting, incorporated with 7.2 g of maleic anhydride and reacted together under agitation for 4 hours to obtain an acid-modified resin (4-II) having a softening point of 151.5° C. and an acid value of 11.4 mg KOH/g.

Thereafter, 180 g of the thus obtained acid-modified resin (4-II) were incorporated with 20 g of a resol-type phenol resin prepared from p-tert.-octylphenol and formaldehyde and then reacted together at 220° C. for 3 hours thereby to obtain a final modified resin (4-III) having a softening point of 170.5° C. and an acid value of 11.2 mg KOH/g.

EXAMPLES 1–3 AND COMPARATIVE EXAMPLES 1–3

The final modified resins obtained in Syntheses 1–3 and Comparative Synthesis, and a control resin, were each used in preparing a varnish and gel varnish. An ink composition was prepared using each of the varnishes and gel varnishes and evaluated for ink characteristics or performances with the results being shown in the following Table 1.

The control resin used in Comparative Examples 2–3 was a resin produced under the trademark "Tamanol 354" by Arakawa Chemical Co., Ltd., Japan, and the ink used in Comparative Example 3 was the one which had been adjusted to cause scumming at 30° C. by adding a solvent "Solvent No.5" (an organic solvent for inks, produced by Nippon Oil Co., Ltd.) to the ink of Comparative Example 2.

Further, the varnishes, gel varnishes and ink compositions were respectively prepared as indicated hereunder, and the evaluations for ink characteristics as well as the results of printing are as shown hereunder.

Preparation of varnish

Forty (40) parts by weight of each of the final modified resins and 20 parts by weight of linseed oil No.4 (a drying oil for inks, produced by Toshin Oil and Fat Co., Ltd.) were cooked at 200°–210° C. for 30 minutes, incorporated with 40 parts by weight of Solvent No.5 and then heated to 140°–150° C. for 20 minutes thereby to obtain a varnish.

Preparation of gel varnishes

Forty (40) parts by weight of each of the final modified resins and 20 parts by weight of linseed oil No.4 were cooked at 200°–210° C., incorporated with 2.0 parts by weight of Optope Al (a gelling agent for varnishes, produced by Hope Pharmaceutical Co., Ltd.) and 38 parts by Solvent No.5 and then heated to 140°–150° C. for 20 minutes thereby to obtain a gel varnish.

Preparation of Ink Compositions

The following ingredients were kneaded by the use of a three-roll unit to obtain ink compositions.

| | |
|---|---|
| Seika First Yellow 2340 (a pigment for inks, prepared by Dainichi Seika Co., Ltd., Japan) | 15.0 parts by weight |
| Each of varnishes | 64.7 parts by weight |
| Each of gel varnishes | 20.0 parts by weight |
| Cobalt napthenate (a dryer for inks, produced by Nakarai Chemicals Ind. Co., Ltd., Japan) | 0.3 parts by weight |

Characteristics of Ink Compositions and Prints

As the printing machine, there was used an improve one in which the drum surface may be elevated in temperature by passing warmed water through the inside of the drum and to which a Toray-type waterless plate (positive type) was fixed. Printing was effected while elevating the surface of the plate in temperature without supplying a dampening solution, and the temperature of the plate surface at which the prints obtained with the test ink composition exhibit scumming at a certain fixed color density on solid was looked on as a scumming-occurring temperature. In practical printing, the higher scumming-occurring temperature an ink composition has, the more difficult is it for the ink to cause scumming.

Then, at 30° C., the ink compositions so prepared were measured for their fluidity (flow value) with a spread meter and for their tack value with an ink-o-meter.

These ink compositions were respectively printed on a to-be-printed substrate using a waterless plate having nonimage area made of silicone rubber and supplying no dampening solution to the plate on Komori splint lithographic printing press, to obtain prints. Then, the solid of the print at which the color density was 0.95 as determined by a Macbeth densitometer, were measured for their gloss value with a 60-degree specular reflection glossmeter. The results are as shown in Table 1.

TABLE 1

|  | Kind of resin | Scumming-ocurring temperature (°C.) | Tack value | Flow value | Gloss | Piling |
| --- | --- | --- | --- | --- | --- | --- |
| Example 1 | 1-III (Synthesis 1) | 30 | 13.0 | 34.0 | 60 | None |
| Example 2 | 2-III (Synthesis 2) | 29 | 14.0 | 36.0 | 62 | None |
| Example 3 | 3-III (Synthesis 3) | 31 | 14.0 | 35.0 | 60 | None |
| Comp. Example 1 | 4-III (Comp. Synthesis) | 24 | 13.0 | 36.0 | 59 | None |
| Comp. Example 2 | Control | 34 | 20.0 | 35.0 | 45 | Severe |
| Comp. Example 3 | Control | 30 | 17.0 | 36.0 | 50 | Mild |

It is seen from Table 1 that the ink compositions of this invention obtained in Examples 1-3 have satisfactory resistance to scumming and excellent printability as compared with that obtained in Comparative Example 1, and that the prints obtained with the former ink compositions have satisfactory gloss as compared with that obtained with latter. In addition, the ink compositions (using the control resin therein) obtained in Comparative Examples 2-3 exhibit satisfactory resistance to scumming, but they exhibit a high tack value thereby to cause piling during printing, and the prints obtained therewith have unsatisfactory gloss.

Effects of this invention

This invention has made it possible to provide ink compositions for waterless plate for lithography, which will exhibit not only satisfactory resistance to scumming but also excellent printability when used.

What is claimed is:

1. An ink composition for waterless plates which comprises a resin (III) as the vehicle, the resin (III) being obtained by:
   copolymerizing 100 parts by weight of at least one compound (A) selected from the group consisting of (1) fivemembered compounds having a conjugated double bond represented by the following general formula;

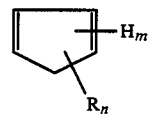

wherein H is hydrogen, R is an alkyl group having 1-3 carbon atoms, m and n is zero or an integer of at least one, and m+n=6, and (2) Diels-Alder adducts thereof, with 5-200 parts by weight of an unsaturated aromatic hydrocarbon monomer (B) having a carbon-carbon double bond and a benzene ring in the molecule to obtain a hydrocarbon resin (I), reacting 100 parts by weight of the thus obtained resin (I) with 0.5-20 parts by weight of at least one compound (C) selected from the group consisting of unsaturated carboxylic acids and the anhydrides thereof to obtain an acid-modified resin (II), and further reacting 100 parts by weight of the thus obtained acid-modified resin (II) with 5-100 parts by weight of a phenol resin (D) obtained by the condensation of a phenolic compound and formaldehyde, thereby to obtain a final modified resin (III).

2. An ink composition according to claim 1, wherein said compound (A) is at least one member selected from the group consisting of cyclopentadiene, methylcyclopentadiene, dicyclopentadiene, cyclopentadiene-methylcyclopentadiene comonomer and tricyclopentadiene.

3. An ink composition according to claim 1, wherein said compound (B) is at least one member selected from the group consisting of styrene, vinyltoluene, α-methylstyrene, indene and methylindene.

* * * * *